US006937767B1

(12) United States Patent
Burak et al.

(10) Patent No.: US 6,937,767 B1
(45) Date of Patent: Aug. 30, 2005

(54) DIAGNOSIS ORIENTED LOSSY COMPRESSION OF MEDICAL IMAGES

(75) Inventors: Yoram Burak, Tel-Aviv (IL); Ronen Nizry, Raanana (IL); Menashe Benjamin, Raanana (IL)

(73) Assignee: Algotec Systems Ltd., Raanana (IL)

( * ) Notice: Subject to any disclaimer, the term of this patent is extended or adjusted under 35 U.S.C. 154(b) by 607 days.

(21) Appl. No.: 09/555,391

(22) PCT Filed: Nov. 24, 1998

(86) PCT No.: PCT/IL98/00574

§ 371 (c)(1),
(2), (4) Date: May 26, 2000

(87) PCT Pub. No.: WO99/28858

PCT Pub. Date: Jun. 10, 1999

Related U.S. Application Data

(60) Provisional application No. 60/109,569, filed on Nov. 23, 1998.

(30) Foreign Application Priority Data

Nov. 29, 1997 (IL) ................................................. 122361

(51) Int. Cl.[7] ................................................. G06K 9/36
(52) U.S. Cl. ........................ 382/232; 382/128; 382/240
(58) Field of Search ................................. 382/128, 131, 382/132, 232, 238, 239, 240, 250, 251, 305, 311, 248; 707/101, 104; 709/203, 219, 224, 246, 247; 348/77, 398.1, 395.1, 404.1, 405.1, 437.1, 438.1; 345/419; 708/203; 375/240.03, 240.02, 240.11, 240.18, 240.19, 240.2; 358/430, 261.2

(56) References Cited

U.S. PATENT DOCUMENTS 4,438,495 A   3/1984  Collins et al. ............... 382/131
4,675,733 A   6/1987  Tanimoto et al. ............ 358/138
5,072,295 A   12/1991 Marakami et al. .......... 358/136

(Continued)

FOREIGN PATENT DOCUMENTS

WO    WO 98/19263 A1    5/1998    ........... G06F/19/00

OTHER PUBLICATIONS

Chong et al., Concurrent Processing for Picture Archiving and Communication System (PACS), Jul. 7, 1995, pp. 468–472, IEEE.*

Albanesi, M. G. et al.; "Image Compression by the Wavelet Decomposition"; Signal Processing; vol. 3; No. 3; May–Jun. 1992; pp. 265–274.

Graps, A.; "An Introduction to Wavelets"; IEEE Computational Science and Engineering Summer 1995; vol. 2; No. 2; published by IEEE Computer Society.

Hilton, M.L. et al.; "Compressing Still and Moving Images with Wavelets"; Multimedia Systems; vol. 2; No. 3.

Watson, A. B. et al.; "Visual Thresholds for Wavelet Quantization Error"; SPIE Proceeding; vol. 2657; paper #44; Human Vision and Electronic Imaging; The Society for Imaging Science and Technology; 1996.

(Continued)

*Primary Examiner*—Yon J. Couso

(57) ABSTRACT

A method of compressing a medical image, including:
 providing a medical diagnostic image, having associated therewith at least one windowing parameter;
 automatically selecting a desired compression quality, responsive to the at least one windowing parameter; and
 compressing the image, using a lossy compression method, such that a decompressed image will have substantially the desired compression quality. Preferably, the at least one windowing parameter is provided by an imaging technician. Preferably, the compression method is a wavelet compression method.

75 Claims, 9 Drawing Sheets

U.S. PATENT DOCUMENTS

| | | | | |
|---|---|---|---|---|
| 5,214,507 A | | 5/1993 | Aravind et al. | 348/390.1 |
| 5,243,419 A | | 9/1993 | Faryar et al. | 358/133 |
| 5,263,099 A | * | 11/1993 | Kapcio et al. | 382/131 |
| 5,305,204 A | * | 4/1994 | Ohhashi | 382/131 |
| 5,414,780 A | | 5/1995 | Carnahan | 382/276 |
| 5,432,871 A | * | 7/1995 | Novik | 382/232 |
| 5,438,633 A | * | 8/1995 | Ghaderi | 358/430 |
| 5,583,952 A | * | 12/1996 | Resnikoff et al. | 382/240 |
| 5,596,602 A | | 1/1997 | Couwenhoven et al. | 375/240 |
| 5,602,589 A | | 2/1997 | Vishwanath et al. | 375/240.11 |
| 5,621,466 A | | 4/1997 | Miyane et al. | 375/240.2 |
| 5,668,998 A | | 9/1997 | Mason et al. | 395/701 |
| 5,684,714 A | * | 11/1997 | Yogeshwar et al. | 382/232 |
| 5,694,531 A | * | 12/1997 | Golin et al. | 345/419 |
| 5,734,677 A | * | 3/1998 | Liew et al. | 382/239 |
| 5,761,333 A | * | 6/1998 | Hsieh et al. | 382/131 |
| 5,835,618 A | * | 11/1998 | Fang et al. | 382/132 |
| 5,905,815 A | * | 5/1999 | Mack et al. | 382/250 |
| 5,960,123 A | * | 9/1999 | Ito | 382/240 |
| 5,987,621 A | * | 11/1999 | Duso et al. | 709/224 |
| 5,988,863 A | * | 11/1999 | Demos | 708/203 |
| 6,014,694 A | * | 1/2000 | Aharoni et al. | 709/219 |
| 6,115,486 A | * | 9/2000 | Cantoni | 382/128 |

OTHER PUBLICATIONS

Wickerhouser, M. V. et al.; "High–Resolution Still Picture Compression"; Digital Image Processing.

Xiong, Z. et al.; "Space–Frequency Quantization for Wavelet Image Coding"; IEEE Transactions on Image Processing; vol. 6; No. 5; May 1997.

Andresen, D. et al.; "Scalability Issues for High Performance Digital Libraries on the World Wide Web;" May 13–15, 1996; Proceedings of The Third Forum on Research and Technology Advances in Washington; DC; US; IEEE Comput. Soc, US; pp. 139–148.

Venbrux, J. et al.; "A VLSI Chip Solution for Lossless Medical Imagery Compression"; SPIE vol. 2164; pps. 561–572.

* cited by examiner

DIAGNOSIS ORIENTED LOSSY COMPRESSION OF MEDICAL IMAGES

RELATED APPLICATION

This application is a U.S. National filing of PCT Application PCT/IL98/00574, filed Nov. 24, 1998.

This application is a 119(e) of a U.S. Provisional application No. 60/109,569 of same title, same inventors and same assignee filed in the U.S. Patent and Trademark Office on Nov. 23, 1998, the disclosure of which is incorporated herein by reference.

FIELD OF THE INVENTION

The present invention relates to the field of tele-radiology, and in particular to the compression and transmission of diagnostic quality images.

BACKGROUND OF THE INVENTION

It is becoming more common for physicians to require diagnostic quality images to be transmitted, via computer communication methods, from an image server to clients stations, at which there are physicians, over large distances. However, due to the large size of the images, the high level of detail required for diagnosis and the limited bandwidth of computer communication lines, it is difficult to transmit such diagnostic quality images. One physical difference between diagnostic quality images and other images is that diagnostic quality images usually include 9–16 bits per pixels, while regular images are usually 8 bits per pixel.

One solution, described in a PCT application "Data Distribution System", PCT/IL97/00349, filed Oct. 29, 1997 in the Israel Receiving office, by applicant Algotec Systems Ltd., the disclosure of which is incorporated herein by reference, interacts with a physician so that only those images, regions of interest and/or detail levels which he requires are transmitted.

Another solution is to compress the images, using a lossy compression scheme. However, lossy compression may reduce or even negate the diagnostic quality of the images. The most common types of lossy image compression methods involve transforming the data using a transform into a plurality of coefficients. Typically, the transform is chosen so that most of the energy of the image is concentrated in a small number of the coefficients. The low energy coefficients are either dropped or encoded using a low resolution encoding method, thus achieving the desired compression. Typically, all the coefficients are quantized.

Wavelet compression is a relatively new type of lossy image compression, utilizing the wavelet transform. Many publications, including "An Introduction to Wavelets", by Amara Graps, in *IEEE Computational Science and Engineering Summer* 1995, Vol. 2 No. 2, published by the IEEE Computer Society, Los Alamitos, California, USA, "Compressing Still and Moving Images with Wavelets", by M. L. Hilton, B. D. Jawerth and A. Sengupta, in *Multimedia Systems*, Vol. 2, No. 3, "High-Resolution Still Picture Compression", by M. V. Wickerhauser, in *Digital Image Processing* and "Space-Frequency Quantization for Wavelet Image Coding", by Zixiang Xiong, Kannan Ramchandran and Michael T. Orchard, in *IEEE Transactions on Image Processing*, Vol. 6, No. 5, May 1997, the disclosures of which are incorporated herein by reference, describe the application of wavelet compression for lossy image compression. In addition, some of these references describe changing various aspects of the compression methods and quantization portions of the method responsive to human perceptual abilities. In addition, the use of RMSE (root mean square error) or human-weighted-RMSE for image quality evaluation is also described therein.

"Visual Thresholds for Wavelet Quantization Error", by A. B. Watson, G. Y. Yang, J. A. Solomon and J. Villasenor, in SPIE Proceeding Vol. 2657, paper #44, *Human Vision and Electronic Imaging*, B. Rogowitz and J. Allebach, Ed., The Society for Imaging Science and Technology, (1996), the disclosure of which is incorporated herein by reference, describes setting wavelet quantization responsive to human visual abilities and in particular to an expected level of zooming and expected display resolution.

SUMMARY OF THE INVENTION

It is an object of some embodiments of the present invention, to provide a method of compressing an image, so that the diagnostic quality of the image will be unaffected or minimally affected. In a preferred embodiment of the invention, the compression method is used as part of a data transmittal method. Alternatively, it may be used when generating a database of compressed images.

It is an object of some embodiments of the present invention to provide a method of compressing an image, which utilizes information related to image content and/or diagnostic need to determine an appropriate image compression ratio and/or quality.

One aspect of some embodiments of the present invention relates to using information associated with the image to determine a desired compression thereof. By utilizing such information, it is possible to compress the image so that its diagnostic qualities are not compromised. In accordance with one preferred embodiment of the invention, windowing parameters determined by a medical imaging technician are used to automatically determine an allowed RMSE between the compressed image and the uncompressed image. In the majority of cases, the image will be viewed using these windowing parameters. In a preferred embodiment of the invention, the RMSE is defined such that when the image is viewed using those windowing parameters, the allowed errors will be perceptually undetectable (to a predetermined amount). Windowing parameters preferably include a width (a range of gray scale values to use for displaying the image). Additionally or alternatively, windowing parameters include a central gray scale, around which to define the width. Alternatively, the windowing parameters may define a general look-up-table for displaying the image. Alternatively, the windowing parameters may describe various suggested image processing techniques to apply to the image, which affect the range of gray scales used for display, for example, that the image be histogram equalized prior to display.

In a preferred embodiment of the invention, especially when an approximate relationship between an image quality measure and a compression ratio for a particular compression method is known, the windowing information is used to directly choose a compression ratio, rather than an image quality target.

In accordance with a preferred embodiment of the invention, a wavelet based compression method is used, in which it is possible to determine a tradeoff between compression ratio and RMSE. Thus, once a desired RMSE is determined, the compression can be setup to achieve the desired RMSE. The compression parameters which achieve that RMSE may then be transmitted to a client for which the compressed image is intended, prior to transmitting the image, to help setup the transmission channel bandwidth and/or to receive feedback regarding the compression ratio and/or the RMSE.

It should be noted that many other types of compression may be used, including other wavelet transforms, DCT (discrete cosine transform), Fourier Transform, Hadamard transform, and other transform based compression methods and other lossy compression methods where an image quality measure may be defined and met, for example, schemes based on predictive quantization, linear prediction, non-linear prediction and/or vector quantization.

In accordance with preferred embodiments of the invention, other information may be used in addition to—or instead of—the technician-suggested windowing parameters, including, image modality, type of body tissue imaged and/or to be diagnosed, windowing and/or other viewing parameters entered by a physician, type of diagnosis required, image analysis results and/or the existence of a region of interest in the image. Windowing parameters may include, for example, gray scale range (window width) and gray-scale distortion (usually clipping values outside a window, but also possibly pixel value mapping). Viewing parameters include for example, a desired viewing resolution, false color maps and/or a processing to be applied to the image, prior to its being displayed, for example, edge enhancement. Image analysis results may include for example measurements on the image, such as segmentation into tissue areas, statistical properties of the image such as noise distribution or standard deviation and/or a signal to noise ratio of the image. In addition, in any case where suitable windowing parameters may be estimated prior to compression, these estimated parameters may be used. Further, once one image (or even a reduced or degraded image) of a set of images reaches a user, the windowing parameters set by the user himself may be used to drive the lossy compression. In addition, other diagnostic related information entered by the user at the client, for example a region of interest or a specification of body tissue or body part to be diagnosed may also be used at the server to select a compression quality.

In accordance with a preferred embodiment of the invention, the relationship between the allowed RMSE and/or compression ratio and the information associated with the image is determined by empirical experimentation. One example of such empirical determination includes displaying a plurality of images, differing only by their RMSE, to a physician and ascertaining when a difference between them is noticeable and/or would affect a diagnosis of a certain type. This determination is repeated for a plurality of image sets and/or diagnostic situations, such that information covering all possible cases may be determined. Preferably, the physicians are allowed to modify the windowing parameters, so that it is possible to estimate the probability and range of changes in windowing parameters in actual diagnostic situations. Additionally or alternatively, well known human perceptual and cognitive models may be used to calculate the allowed RMSE and other types of artifacts in the compressed images.

In accordance with a preferred embodiment of the invention, criteria other than—or in addition to—RMSE may be used to determine the compression. These criteria include many types of image quality measures, for example, RMSE weighted with the human perceptual abilities. Some types of image compression methods have a problem of artifacts. In a preferred embodiment of the invention, the allowed level of artifacts is an image quality measure that is determined by information associated with the image. It should be noted that the type of compression used may be varied responsive to the modality and/or windowing parameters and/or available bandwidth and/or body part imaged and/or required diagnosis and/or compression ratio.

In some preferred embodiments of the invention, several bits are discarded from the image, responsive to the windowing parameters, either in addition to—or instead of—compression. The number of discarded bits may be a constant, such as to convert 12-bit images to 8-bit images by discarding 4 bits. Alternatively, the number of discarded bits may be responsive to the width of the viewing window defined by the windowing parameter. The particular bits discarded are preferably selected so that the windowed image is minimally impacted. For example, the high-order bits and/or low-order bits may be discarded.

It should be appreciated however that using a wavelet or transform type compression rather than bit-discarding has several advantages, including:

(a) the compression ratio can be much higher;
(b) the error is spread over several bits, so if the viewing parameters are different from the windowing parameters used for the RMSE determination, an image can still be displayed;
(c) the entire original bit-span of the image may be reconstructed, albeit with errors;
(d) wavelet compression allows a finer control over the level of compression; and
(e) wavelet compression is a linear transform, while discarding bits is not.

An aspect of some preferred embodiments of the present invention is related to reducing memory requirements at a client, when transmitting compressed data from a server to a client. In accordance with a preferred embodiment of the invention, the server sends the client information regarding preferred data representation of the data, so that the client can set up a minimal amount of memory necessary to handle the data. In one preferred embodiment of the invention, the server sends the client a signal indicating the number of significant bits in the data. The client can then set up memory arrays having a sufficient number of bits per data item, to contain this information. As can be appreciated, a significant saving in memory can be achieved at the client if only small arrays are set up for data having a small number of significant bits. One particular example where such a saving is useful is in transmitting encoded coefficients in a transform compression method. In many cases the coefficients can be sufficiently represented using only 16 bits. However, in some cases, 32 bits are required. By allowing the client to know in advance whether 16 or 32 bits are advised, the client can allocate only the necessary amount of memory, to store these coefficients. Preferably the signal comprises a single bit to differentiate between the 16 bit and 32 bit situations. However, the signal may also contain the exact number of bits to use.

In accordance with another preferred embodiment of the invention, the data is transmitted from the server to the client as segments, with each wavelet layer comprising several segments. Thus, the client can reconstruct the image a portion at a time.

An aspect of some preferred embodiments of the invention relates to automatically determining a window width, W. In some cases, the window width entered by a viewing technician is incorrect or is unavailable. In a preferred embodiment of the invention, an estimate W2 of an appropriate windowing width is determined from a histogram of pixel values in the image. W is then preferably defined to be a minimum of W1, a windowing width suggested by the image server (e.g., entered by a technician) and W2. Thus, the image quality of the image will be sufficient for both the image-server windowing parameters and for automatic windowing. Alternatively or additionally, W may be limited and/or fixed, for example based on modality, image type and/or diagnostic use of the image. Setting and/or fixing responsive to image type may be useful for image types in which automatic windowing does not work very well. Alternatively or additionally, W2 may be set of fixed rather than W.

An aspect of some preferred embodiments of the invention relates to setting an RMSE and/or a desired compression ratio, responsive to a noise level in the image, alternatively or additionally to the setting being responsive to windowing parameters and/or viewing parameters. Possibly, a different target RMSE is defined for each portion of the image, responsive to a noise level and/or standard deviation in that portion. In a preferred embodiment of the invention, the noise level in an image is determined by counting the number and/or determining a distribution of non-zero valued pixels in noisy black boundary areas of the image. Possibly, the boundary areas themselves are not transmitted from the server to the client. In some cases, an expected noise level may be provided, instead of or in addition to determining the noise level.

There is thus provided in accordance with a preferred embodiment of the invention a method of compressing a medical image, comprising:

providing a medical diagnostic image, having associated therewith at least one windowing parameter;

automatically selecting a desired compressed image quality, responsive to said at least one windowing parameter; and compressing said image, using a lossy compression method, such that a reconstructed image will have substantially said desired compressed image quality.

Preferably, the at least one windowing parameter comprises a window width. Alternatively or additionally, the at least one windowing parameter is automatically estimated. Preferably, said at least one windowing parameter is automatically estimated from an earlier automatically estimated windowing parameter and from a human supplied windowing parameter. Preferably, said human-supplied windowing parameter and said earlier automatically estimated windowing parameter each comprise a window width. Preferably, said compressed image quality is selected responsive to a minimum of said widths. Alternatively, said compressed image quality is selected responsive to a function of said widths.

In a preferred embodiment of the invention, said at least one windowing parameter is provided by a viewing technician. Alternatively or additionally, said at least one windowing parameter is provided by a diagnostician. Alternatively or additionally, said at least one windowing parameter is associated with said image in a DICOM description of said image.

In a preferred embodiment of the invention, said at least one windowing parameter is determined responsive to an acquisition modality of said medical image. Alternatively or additionally, said at least one windowing parameter is determined responsive to a content of said medical image.

In a preferred embodiment of the invention, said automatically selecting comprises automatically selecting a desired compressed image quality, responsive to at least one viewing parameter supplied by a diagnostician, in association with the viewing of the image. Preferably, automatically selecting a desired compressed image quality comprises selecting a desired compressed image quality as a function of said at least one windowing parameter and said at least one viewing parameter. Alternatively or additionally, said at least one viewing parameter comprises a viewing resolution. Alternatively or additionally, said at least one viewing parameter comprises a region of interest. Alternatively or additionally, said at least one viewing parameter comprises an image processing function. Alternatively or additionally, the method comprises determining a windowing width responsive to said at least one viewing parameter.

There is also provided in accordance with a preferred embodiment of the invention, a method of compressing a medical image, comprising:

providing a medical diagnostic image, having associated therewith at least one viewing parameter supplied by an imaging technician, in association with the acquisition and storage of the image;

automatically selecting a desired compressed image quality, responsive to said at least one viewing parameter; and compressing said image, using a lossy compression method, such that a reconstructed image will have substantially said desired compressed image quality.

Preferably, the at least one viewing parameter comprises at least one windowing parameter. Alternatively or additionally, the at least one windowing parameter comprises a window width.

In a preferred embodiment of the invention, automatically selecting comprises automatically selecting a desired compressed image quality, responsive to diagnosis related information associated with the medical image.

There is also provided in accordance with a preferred embodiment of the invention, a method of compressing a medical image, comprising:

providing a medical diagnostic image, having associated therewith diagnosis related information;

automatically selecting a desired compressed image quality, responsive to said diagnosis related information; and compressing said image, using a lossy compression method, such that a reconstructed image will have substantially said desired compressed image quality.

Preferably, the diagnosis related information comprises an identification of a body portion imaged in the image. Alternatively or additionally, the diagnosis related information comprises an identification of a required diagnosis of the image. Alternatively or additionally, the diagnosis related information comprises an identification of a body tissue to be diagnosed. Alternatively or additionally, the diagnosis related information comprises an imaging modality of the image.

In a preferred embodiment of the invention, said automatically selecting a desired compressed image quality comprises automatically selecting a desired compressed image quality responsive to a noise level in at least a part of said image. Alternatively or additionally, said automatically selecting, comprises automatically selecting said image quality responsive to an image quality measure determined from said noise level and responsive to an image quality measure determined from a windowing width associated with said image.

In a preferred embodiment of the invention, said noise image quality measure and said windowing image quality measure comprise RMSE values. Preferably, automatically selecting an image quality measure comprises automatically selecting an image quality measure which is equal to or higher than the lower between said noise RMSE and said windowing RMSE.

There is also provided in accordance with a preferred embodiment of the invention, a method of compressing a medical image, comprising:

providing a medical diagnostic image;

automatically selecting a desired compressed image quality responsive to a noise level in at least a part of said image; and compressing said image, using a lossy compression method, such that a reconstructed image will have substantially said desired compressed image quality.

Preferably, said noise level is independently determined for a plurality of portions of said image. Alternatively or additionally, said noise level is determined responsive to an estimation of distribution of noise values in the image. Alternatively or additionally, said noise level is estimated responsive to a lowest standard deviation determined in each of a plurality of parts of the image. Preferably, said plurality of parts comprises at least 50 parts, each of which is no larger than 1/50 of the area of the image.

In a preferred embodiment of the invention, said noise level is determined by analyzing noisy black boundary portions of said image.

In a preferred embodiment of the invention, compressing comprises compressing using a transform method which generates coefficients. Preferably, the transform method comprises a wavelet transform. Alternatively or additionally, the transform method comprises a cosine transform. Alternatively or additionally, the transform method comprises a Fourier transform. Alternatively or additionally, the transform method comprises a Hadamard transform. Alternatively or additionally, the transform method comprises a linear transform. Alternatively or additionally, compressing comprises quantizing said coefficients.

In a preferred embodiment of the invention, compressing comprises quantizing. Alternatively or additionally, quantizing comprises linear quantizing. Alternatively or additionally, quantizing comprises predictive quantizing. Alternatively or additionally, quantizing comprises human-visual-perception-weighted quantizing. Alternatively or additionally, quantizing comprises quantizing to meet said desired compressed image quality. Alternatively or additionally, quantizing comprises iteratively determining parameters for said quantizing, to meet said desired compressed image quality. Alternatively or additionally, said image is divided into a plurality of regions and wherein a different image quality target is defined for each region. Alternatively or additionally, said image comprises significant regions where only a small distortion by compression is expected and wherein said desired image quality is selected responsive to an expected average distortion outside said significant regions.

In a preferred embodiment of the invention, said desired compressed image quality comprises a measure of an error between the image and the compressed-and-reconstructed image.

In a preferred embodiment of the invention, the quality measure comprises a root mean square error (RMSE).

In a preferred embodiment of the invention, providing a medical image comprises providing a medical image to a server responsive to a request by a client and comprising transmitting said compressed image to said client. Preferably, the method comprises reconstructing said image, at said client, to a full range of gray scale values. Alternatively or additionally, said client transmits information related to the image to said server and said image quality, for later images, is determined responsive to said information. Preferably, said information comprises a region of interest. Alternatively or additionally, said information comprises at least one windowing parameter.

There is also provided in accordance with a preferred embodiment of the invention, a method of compressing a medical image, comprising:

providing a medical diagnostic image, having associated therewith at least one technician supplied windowing parameter;

automatically selecting a desired compression ratio, responsive to said at least one windowing parameter; and compressing, using a lossy compression method, said image to the desired compression ratio.

There is also provided in accordance with a preferred embodiment of the invention, a method of quantizing data for compression thereof, comprising:

automatically selecting a desired amount of error during said quantizing, responsive to information relating to a desired diagnosis of an image associated with said data; and quantizing said data to have the desired amount of error.

Preferably, the information comprises at least one windowing parameter selected for said desired diagnosis.

There is also provided in accordance with a preferred embodiment of the invention, a method of calculating a target distortion for an image containing a significant amount of background areas and in which a certain level of distortion is desired in important areas of the image, comprising:

determining the ratio between the important areas and the entire image; and calculating a target distortion so that the total amount of distortion is substantially proportional to said ratio, whereby the desired certain level of distortion is expected in the important areas.

There is also provided in accordance with a preferred embodiment of the invention, a method of transmitting compressed data from a server to a client, comprising:

determining at the server, an internal representation required to faithfully represent the data;

transmitting an indication of said representation to the client, prior to transmitting said data;

setting up, at the client, memory arrays suitable for said internal representation; and transmitting said data from the server to the client.

Preferably, said data comprises transform coefficients. Alternatively or additionally, said data is compressed using entropy encoding. Alternatively or additionally, said client determines whether to use said indicated representation or a less precise representation, responsive to a desired image quality at said client. Alternatively or additionally, said determining comprises determining said representation responsive to a range of values represented by individual elements of said data. Alternatively or additionally, said determining comprises determining a number of bits to use in said internal representation. Alternatively or additionally, said determining comprises determining whether to use a fixed point representation or a floating point representation.

There is also provided in accordance with a preferred embodiment of the invention, apparatus for image compression, comprising:

an input which receives a diagnostic medical image and at least one viewing parameter associated with said image, from an image store;

a target distortion estimator which estimates an allowed distortion in the image responsive to the at least one viewing parameter; and an image compressor which compresses said image to meet said target distortion.

There is also provided in accordance with a preferred embodiment of the invention, a method of transmitting compressed wavelet data from a server to a client, comprising:

transforming original data to yield at least one layer, with a plurality of coefficient sets associated with each of said at least one layer;

segmenting the data in each of said coefficient sets into a plurality of segments for each coefficient set; and transmitting data to a client, wherein segments for different coefficient sets are interleaved so that not all the segments from a first coefficient set are transmitted before transmitting segments from at least a second coefficient set.

Preferably, each of said segments comprises a plurality of rows from one of said coefficient sets and said rows are a subset of a number of rows in the coefficient set. Alternatively or additionally, each of said segments comprises a plurality of columns from one of said coefficient sets and wherein said columns are a subset of a number of columns in the coefficient set. Alternatively or additionally, the method comprises:

receiving at said client at least a first segment and a second segment; and upscale filtering data in said second segment utilizing data in said first segment.

Preferably, receiving comprises receiving data for a certain layer and comprising reconstructing data for a layer higher than said certain layer, from said received data, prior to receiving even one complete coefficient set for said certain layer.

BRIEF DESCRIPTION OF THE DRAWINGS

The present invention will be more clearly understood from the following detailed description of the preferred embodiments of the invention and from the attached drawings, in which.

DETAILED DESCRIPTION OF THE PREFERRED EMBODIMENTS

Figure 1:
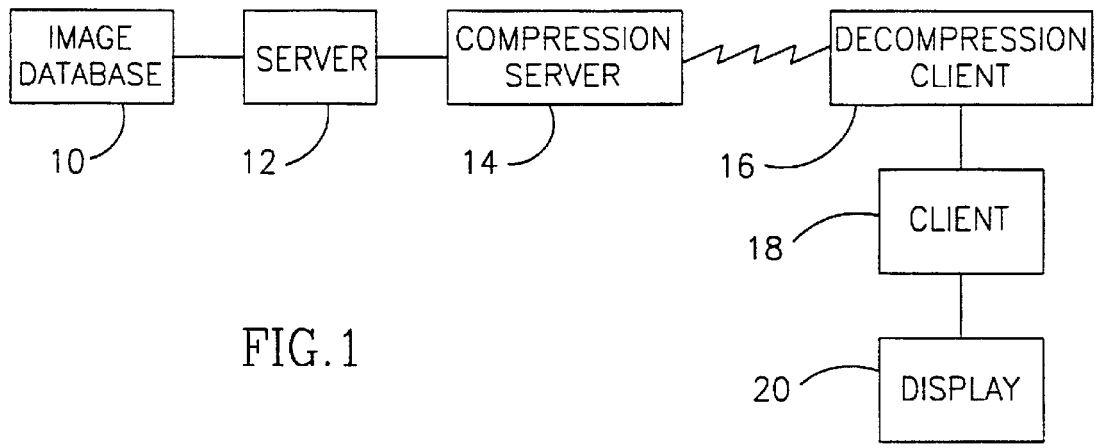
FIG. 1 is a schematic diagram of a client-server configuration, suitable for practicing a compression method in accordance with a preferred embodiment of the invention.

FIG. 1 is a schematic diagram of a client-server configuration, suitable for practicing a compression method in accordance with a preferred embodiment of the invention. A medical image database 10 includes a plurality of stored images. In a typical medical setting, each of these images may have associated therewith information, including:

(a) recommended viewing parameters, including windowing parameters;

(b) image acquisition information;

(c) image modality;

(d) required diagnosis;

(e) previously used viewing parameters; and (f) additional information, for example as defined in the DICOM standard.

A client 18 requests a specific image from a server 12, which then retrieves the requested image from database 10. A compression-server 14 compresses the image and transmits the compressed image to a decompression-client 16, which decompresses the image and passes it to client 18. The decompressed image is then typically displayed on a display 20, for diagnostic purposes.

In a preferred embodiment of the invention, the client is a Medisurf image transfer client, available from Algotec Systems Ltd., Raanana, Israel. The server is preferably a Medisurf image transfer server which communicates and receives images and patient data from a DICOM compliant server (10 in FIG. 1).

In accordance with a preferred embodiment of the invention, compression server 14 automatically determines various parameters of the compression, responsive to information associated with the image. Preferably, the determined parameter is the overall compression ratio, which is preferably determined responsive to a measure of image quality. The required image quality is preferably determined based on the associated information. In one preferred embodiment of the invention, the image quality measure is an RMSE, which is selected, responsive to technician-suggested windowing parameters. The RMSE is preferably chosen so that the RMSE is about or below that which is perceivable by a human observer when viewing an image at its windowing parameters. In some preferred embodiments of the invention, the allowed RMSE is also dependent on the image modality and/or on an identification of the body part imaged.

In one preferred embodiment of the invention, the desired RMSE is estimated based on an expected use for the image, for example, based on the required diagnosis. Alternatively or additionally, the gray level distribution of the image may also be used to estimate desired windowing parameters.

Generally, a medical image is acquired for a particular reason, typically for a particular required diagnosis, such as identifying a lesion. Alternatively or additionally, an image is requested by a physician, from the server, for a particular reason, which he preferably supplies. Alternatively or additionally, a medical image is forwarded to a physician responsive to a need for a particular diagnosis, for example for a second opinion or for an expert opinion.

In accordance with a preferred embodiment of the invention, the allowed RMSE per tissue of body portion imaged and/or modality and/or windowing parameters and/ or other types of information associated with the image, are determined using experiments with radiologists. In accordance with one preferred embodiment of the invention, the RMSE is determined as an error rate relative to the window, e.g., 1%, 3%, 5% or 10% of the width of the window.

In accordance with one preferred embodiment of the invention, a wavelet compression method is used. One quality of the wavelet transform and other transform methods is the ease in which the compression rate may be determined so that a particular RMSE is achievable. The RMSE of a wavelet transformed image is the same as the RMSE of the original image. Thus, compression parameters for the wavelet compression may be directly chosen so that a desired RMSE is achieved. Other types of image quality measures may not have this useful quality, and a direct calculation of the actual image RMSE may require reconstructing the image. Thus, in preferred embodiments of the invention which use a particular combination of a compression method and a quality measure, other than the wavelet/RMSE combination, the method may be iterative, i.e., it may be necessary to search a space defined by the compression parameters to find a set of parameters which allow the compressed image to meet the image quality measure requirements.

It should be appreciated that, in accordance with a preferred embodiment of the invention, a user at the decompression client may decide to request an image of the original quality, either responsive to desiring a radically different window, to improve diagnostic ability or for any other reason. Nevertheless, compressed images may be used to skim the available images and select which ones to concentrate on.

In a preferred embodiment of the invention, the windowing operation is performed by mapping the range of gray scales [(C–W/2)–(C+W/2)] into the range [0 . . . 255], where C is the center of the window and W is the window width. Preferably, the mapping is linear. Other types of windowing methods may be defined by the particular imaging system and/or server and used by the technician and/or physician. For example, a windowing method based on a center value and a Gaussian distribution of values in the range [0 . . . 255]. It should be appreciated that windowing information, as provided by a technician is based on the range of gray scales which a physician is expected to want to see, not only on the statistical distribution of gray scale values in the image. In general, when the windowing parameters describe a wider window, then higher RMSE values may be used. The reason is that the human perceptual system has a relatively fixed proportional sensitivity, known as a JND (just noticeable difference) of between 1% and 10% of the range of gray scales viewed. Thus, if for example the width is 100 values, the JND is between 1 and 10. However if the width is 1000, the JND is between 10 and 100. The preferred RMSE is strongly positively dependent on the JND. Thus, when the JND is higher, the RMSE can be allowed to be higher.

A wavelet based compression method, in accordance with a preferred embodiment of the invention generally comprises three steps:

(a) transforming the image pixel data into several sets of coefficients, using a wavelet transformation;

(b) quantization of the wavelet coefficients (this quantization is performed to reach a target RMSE); and (c) optionally, encoding the quantized coefficients using entropy coding, preferably a combination of Rice encoding and run-length encoding of zero coefficients.

Rice encoding is described, for example, in "A VLSI Chip Solution for Lossless Medical Imagery Compression," by J. Venbrux,.Pen-Shu Yeh, G. Zweigle, and J. Vesel, in the SPIE Conference on Medical Imaging, 1994, Newport Beach California, USA, the disclosure of which is incorporated herein by reference.

In wavelet transforms, a wavelet is scaled to a plurality of scales and each scaled wavelet is convoluted with the image to generate four sets of coefficients (A, D, V, H) for each scale. The sets for each scale of convolution are termed a layer. Each set is generally arranged as a rectangle having rows and columns. In accordance with a preferred embodiment of the invention, each layer of the image is processed separately, so that the amount of memory required to perform the encoding is minimized. Further, each coefficient set in each layer is preferably divided into segments, each of which comprises a subset of the rows of the coefficients for a particular layer. These segments are preferably transmitted to the client in an interleaved manner, to allow for sequential processing of segments during the wavelet inverse transform, at the client.

In accordance with a preferred embodiment of the invention, the coefficients are entropy coded and then transmitted from the server to the client in blocks. Preferably, each block contains the data from two layers of the wavelet transformation. Thus, each additionally transmitted block increases the resolution of the image that can be reconstructed from previously received blocks.

Figure 2:
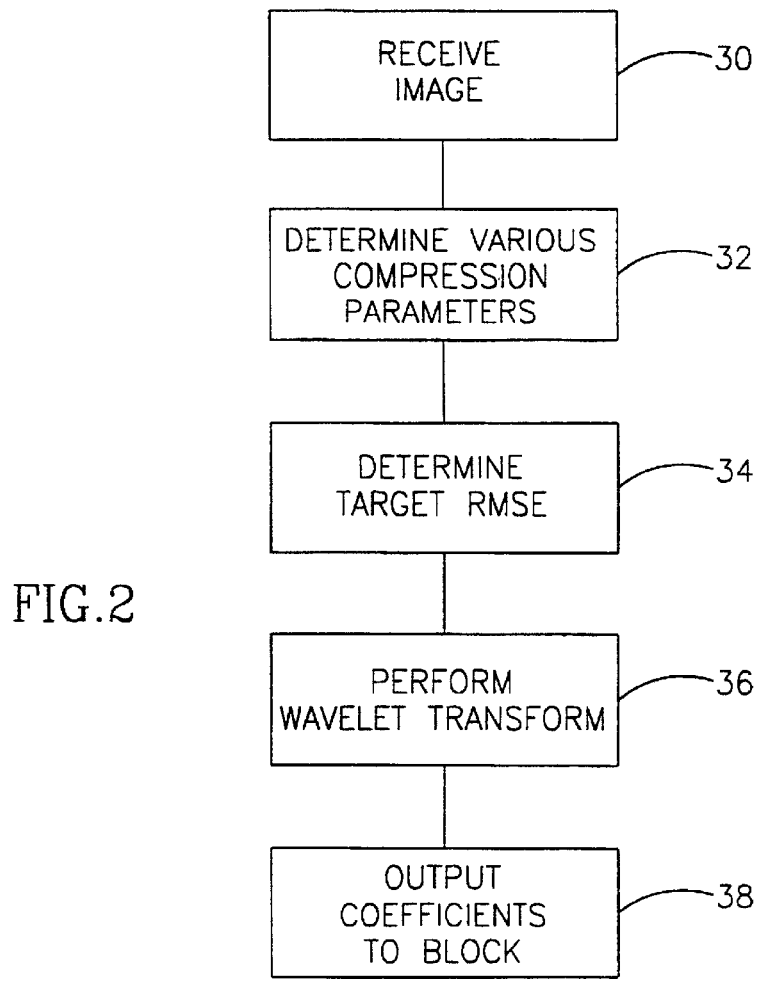
FIG. 2 is a flowchart of a wavelet transforming process, in accordance with a preferred embodiment of the invention.

FIG. 2 is a flowchart of a wavelet transforming process, in accordance with a preferred embodiment of the invention.

An image is received (30) from the server, preferably with associated information. Then, various compression parameters are determined (32). One parameter is the number of wavelet layers, which is preferably determined according to the lower of the width and height of the image. Typically, the number of layers is $\log_2$(small dimension)–4. Another parameter to be determined is the dimension of the coefficient sets in each level. The number of columns in each coefficient set are preferably determined responsive to whether, n, the number of columns in the decomposed image, is odd or even. If it is even, then the number is n/2. Otherwise, two coefficient sets will have (n+1)/2 column, while two will have (n–1)/2 columns. The number of rows is preferably calculated in a similar manner, based on the number of rows in the decomposed image.

Another parameter which is preferably set is the number of rows (Rs) in each segment. Preferably, this number is determined by dividing the maximum segment size by the width of the coefficient sets. This maximum segment size is a parameter of the encoding algorithm. In a preferred embodiment of the invention, the parameter is 16384, chosen to minimize the swapping, of memory blocks. The number of rows is preferably always larger than a predetermined value, such as 16, to avoid edge effects in filtering stages of the decoder of the decompression client. However, in large images, to maintain the requirements of 16 rows, a larger segment size may be required. In some preferred embodiments of the invention the columns are segmented either in addition to—or instead of—the rows.

Another parameter which is preferably set is the number of segments in each coefficient set, which is preferably associated with the number of rows in the last segment. Preferably, the number of rows in each segment is Rs. The last segment is preferably setup to have between 0.5*Rs and 1.5*Rs. However, where there is only one segment, the number of rows may be smaller than 0.5*Rs. Rs and the number of segments are preferably selected so that they are the same for all four coefficient sets generated by a layer of the wavelet transform, even though the four coefficient sets may have slightly different dimensions.

As described above, the number of layers in each block is preferably two, however, the last block may contain only a single layer.

In a preferred embodiment of the invention, a target RMSE is determined next. However, it should be appreciated, that the target RMSE may be determined at any time before the quantization of the coefficients. One reason why a single RMSE is not suitable for all medical images, even for a single modality, is the large dynamic range of the data (typically 9–16 bits), which are usually viewed using a smaller dynamic range (typically 8 bits or less). The windowing parameters used for viewing typically define a width (number of gray scale values) between 100 and 4000 gray scales, depending, inter alia, on body part, modality and diagnostic use of the image. The windowing parameters preferably also include a gray scale value of the center of the window. In a preferred embodiment of the invention, a target RMSE is selected responsive to the windowing parameters. Typically, the wider the window, the larger the allowed RMSE.

In one embodiment of the invention, the image server is a DICOM compliant image and patient data server, and the windowing width is provided by the server, based on information stored by users. In a preferred embodiment of the invention, the RMSE is calculated by RMSE=A*W*Qf, where W is the window width and A is a constant depending on modality, image dimensions and/or number of wavelet levels, diagnosed body parts and/or statistical measurements made on the image, to determine noisy areas and/or relatively uniform areas. Some of this information may also be available from the DICOM server. Qf is a quality factor which is optionally selected by a user, to define a desired image quality. Generally, lower Qfs result in higher image qualities. Preferably, the default value of Qf is one. Preferably, the highest selectable quality is defined such that RMSE=1. In other preferred embodiments of the invention, A is a function of W. Alternatively or additionally, A may be a function of the window center location.

In a preferred embodiment of the invention, the RMSE takes into account an expected zoom-in or out of the image, for example as described in the above referenced "Visual Thresholds for Wavelet Quantization Error."

In a preferred embodiment of the invention, the target RMSE takes into account possible changes in the windowing setting. Preferably, this is implemented as a parameter (greater than one) by which the RMSE is multiplied. The existence of possible changes may be a property of the image modality and/or diagnosis or it may be manually entered, such as a confidence level entered by the imaging technician.

In some cases, the window width entered by a viewing technician is incorrect, unavailable or not entered. In a preferred embodiment of the invention, an estimate W2 of an appropriate windowing width is determined from a histogram of pixel values in the image. W is then defined to be a minimum of W2 and W1, a windowing width suggested by the image server (e.g., entered by a technician into DICOM). Thus, the image quality of the image will generally be sufficient for both the image-server windowing parameters and for automatic windowing.

In a preferred embodiment of the invention, a window width is determined from an image in the following manner:
1. Only pixels in the middle of the image are considered, preferably those within the center quarter (within 0.25 . . . 0.75 of each image axis).
2. Extreme valued pixels are ignored, for example those above (or below) a certain threshold. In one example, the only the pixels having values above 10% of the mean pixel value are considered.
3. A window width is set to be a product of a factor and a standard deviation of the considered pixels, for example, to be three times the standard deviation.

Alternatively or additionally, W may be limited, for example based on modality and/or image type. In one example, W is limited to 350 for CT images. In another example, a fixed windowing width, such as 150 is typically used for RF images, so W2 will be set to 150. It is noted that automatic windowing does not work well for some image types. For example, CT brain images usually use a narrower window than suggested by automatic windowing. In a preferred embodiment of the invention, a user may indicate the image type and W2 will be set to a predetermined value based on the image type, for example 70 for CT brain images, vs. 250 for other CT soft tissue image.

In a preferred embodiment of the invention, in some types of medical images, the target RMSE requires further processing to be properly defined. In computerized tomography (CT) images, for example, a significant portion of the image may comprise relatively constant values, where there is not expected to be much image distortion. Thus, the distortion will be concentrated in the non-uniform, image carrying, portions, which is not desirable. In accordance with one preferred embodiment of the invention, an average RMSE is calculated so that the RMSE on the image carrying portion will be a desired RMSE, hereafter Rl. A second RMSE, R2, is calculated as R2=A*W*√((n−n0)/n), where n is the number of pixels in the image and n0 is the number of black pixels in the image. Alternatively, the square root operation may be dispensed with. Alternatively, n0 may be determined by segmenting the image into foreground and background or into portions containing a significant amount of information and into portions of relatively constant value, and n0 calculated by measuring the uniform portions. Further alternatively, the background is segmented and separated from the image portion, in an earlier step of the image transmission. It should be noted that in CT images, most of the background is typically black, so counting the black pixels is a good estimate of the amount of background. In other image types, segmentation or other background gray level may be more appropriate. In a preferred embodiment of the invention, R2 is modified to take into account a certain expected level of distortion in the uniform areas.

In a preferred embodiment of the invention, the counting of the number of zero valued pixels and/or the calculation of R2 is performed on a subset of pixels in the images. For example, if the number of pixels, n, is larger than 5000, then only one of every n/5000 pixels is tested. Preferably, these pixels are uniformly distributed in the image. For example, if n=10,000 then only 5,000 pixels will be tested.

In a preferred embodiment of the invention, the final RMSE used is a weighted average between R2 and the originally defined target RMSE. The weights are preferably parameters of the compression method, and are preferably found by experimentation. A similar process may be used for other image modalities in which a significant black boundary area is present.

In one preferred embodiment of the invention, where the image is segmented, a different target RMSE is defined for each segment. The final, average RMSE is selected, based on the relative sizes of the segments, so that the target RMSE is reached in each segment. In a preferred embodiment of the invention, the compressed image is tested for compliance with the various target RMSEs, prior to being sent. Alternatively or additionally, the decompression client may indicate to the server and/or to a user at the client, which parts of the image do not meet their target RMSE. In response the server may reduce the target RMSE. Alternatively or additionally, the user may decide to require a better image quality.

Alternatively or additionally, the image is divided into a plurality of regions, each of whose coefficients are quantized separately, such as regions 64×64 pixels in size; and a target RMSE is defined for each region.

In one preferred embodiment of the invention, the image is partitioned based on statistical analysis of the image, for example, a different RMSE may be selected for image portions including noise. Alternatively or additionally, a region of interest (ROT) may be selected, wherein a lower (or higher) target RMSE is desired. This region of interest may be selected by the technician, by a physician who views the image prior to its being sent or by the user at the client. The ROI may be used to decide on an RMSE for further images of the same image set or for a higher quality image of the same image on which an ROI is selected.

Often, an image includes a not insignificant amount of noise. The noise level may be an attribute of the modality, for example with MRI images containing a significant amount of noise. In some cases, an image quality may be deemed sufficient, if the compression-induced error is within a factor of the noise-induced inaccuracies. In a preferred embodiment of the invention, the RMSE is adjusted to take account of noise-induced-inaccuracies in the images. Preferably, an image noise level is determined by analyzing the image. Alternatively or additionally, a noise level may be provided based on the image type, image modality, image acquisition parameters and/or entered by a technician or a viewing physician.

In one example, two RMSE values are set, WRMSE is calculated based on windowing parameters (as described above) and NRMSE is calculated based on the noise level. The target RMSE is preferably determined as a function of the two RMSEs, for example, an average, a maximum value, a look-up table and/or using the RMSEs to determine a correction factor for the target RMSE. Alternatively or additionally, the target RMSE may be multiplied by a quality factor $Q_f$, described above. Possibly $Q_f$ may be automatically determined or suggested responsive to the values of one or more of the noise parameters. In a preferred embodiment of the invention, NRMSE is a product of a determined noise standard deviation and a constant B, possibly 1.2. Alternatively or additionally, NRMSE may be corrected by a factor depending on the number of black pixels in the image: $NRMSE = B*NSTD*\sqrt{((n-n0)/n)}$. A method of determining NSTD is described below with reference to FIGS. 10 and 11.

In a preferred embodiment of the invention, WRMSE is determined as described above using the window width W. Possibly, the noise distribution (e.g., NSTD) may be used to correct WRMSE, as follows. In some images, for example MRI images, a non-uniform image area is surrounded by a noisy black boundary, which may itself be surrounded by a uniform black area. Lossy compression and decompression will usually result in a near zero error rate in the completely black area and a near NSTD error rate in the noisy black area. An estimate of the extent of the completely black and the near black areas, together with an estimate of NSTD, is preferably used to select a target RMSE which will result in a desired RMSE for the non-uniform image portion. In one example, WRMSE is: $\sqrt{((A*A*W*W*(1-boundary\_frac) + NSTD*NSTD*(boundary\_frac - zero\_frac))}$, where zero_frac, the fraction of completely black pixels is preferably n0/n and boundary_frac is an estimate (between 0 and 1) of the fraction of the pixels which belong to the completely or noisy black boundary areas.

In some cases, the determination of the noise parameters may be unreliable. Preferably, if the determined noise is above a threshold value, NRMSE is ignored. Alternatively or additionally, its weighting (in the calculation of RMSE) is varied, responsive to the noise level.

Figure 10:
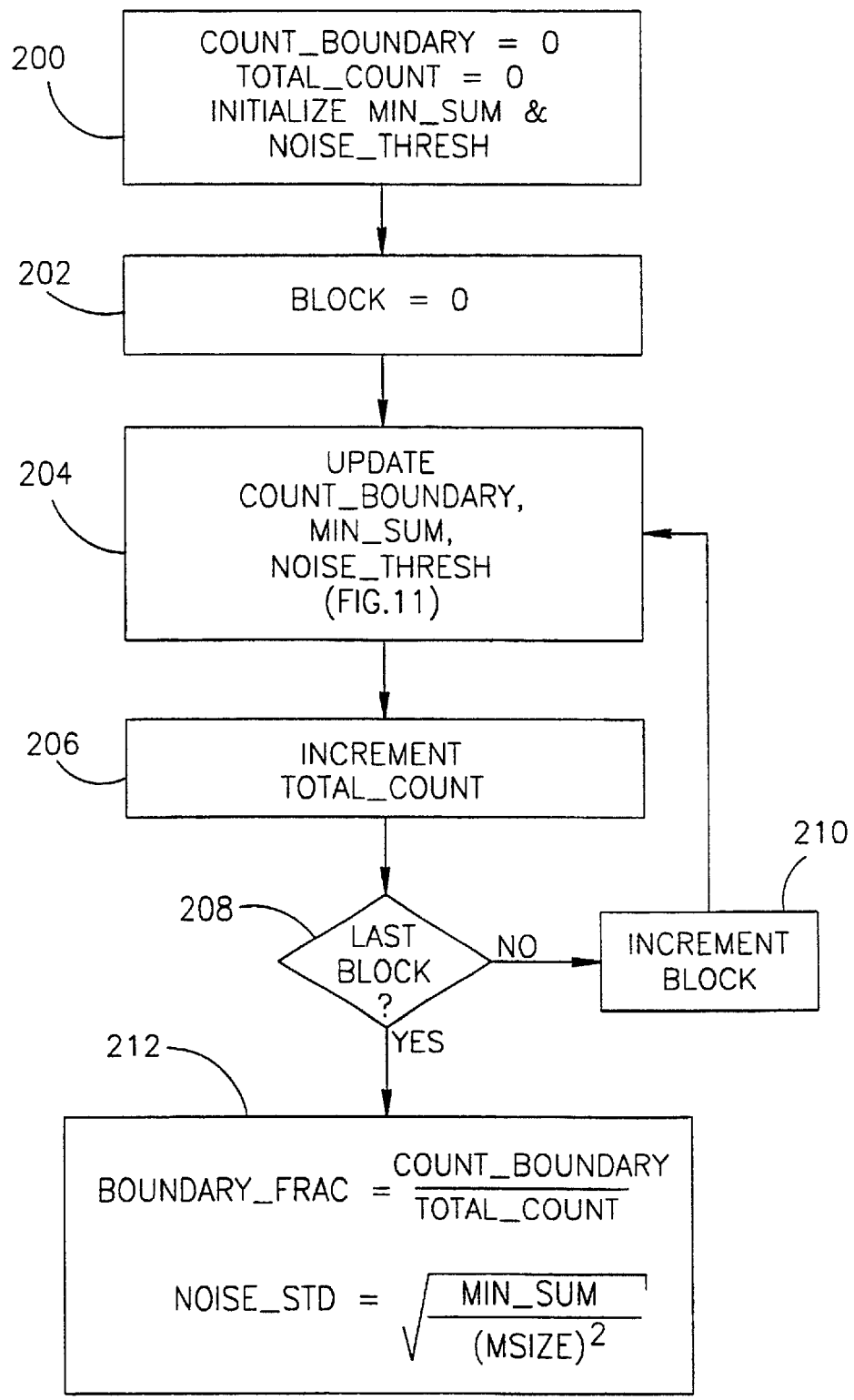
FIG. 10 is a flowchart of a method of estimating parameters of noise in an image, in accordance with a preferred embodiment of the invention.

FIG. 10 is a flowchart of a method of estimating parameters of noise in an image, in accordance with a preferred embodiment of the invention. The image is divided into areas, for example blocks of size MSIZE*MSIZE, where MSIZE is a parameter of the method, for example 15, possibly dependent on the size of the image (in pixels), segmentation and/or its outline. Preferably, the blocks are small, to separately analyze small areas of the image. However, the blocks are preferably large enough so a measurement of standard deviation of noise will be stable in the presence of noise. Preferably, the blocks are of equal size and/or shape. However, this is not required in some preferred embodiments of the invention. The blocks are scanned in an order, for example left-right-up-down and a variable count_boundary is used to count the number of blocks which belong to the noisy boundary or the completely black boundary. A variable total_count is used to count the total number of blocks scanned. An estimate of the noise standard deviation is the lowest standard deviation in all the scanned blocks, where a variable min_sum holds the current lowest sum of squares of deviations from the mean.

Figure 11:
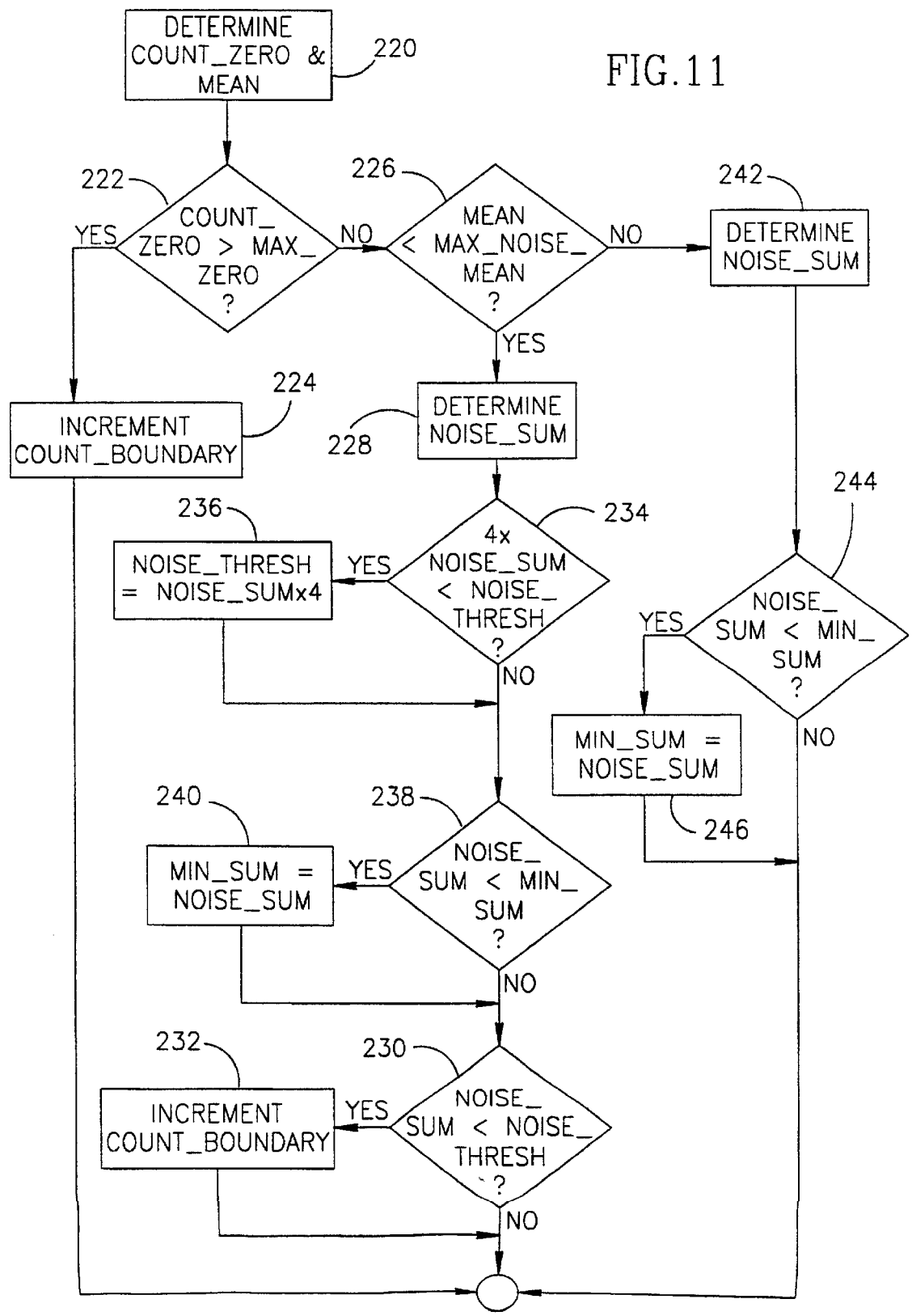
FIG. 11 is a flowchart of a method of parameter estimation of a single block of an image, for the method of FIG. 10.

In an initialization step 200, all the above variables are initialized, counts to zero, min_sum to an arbitrary large number, such as 1000*MSIZE*MSIZE and a variable noise_thresh to an arbitrary maximum deviation required to decide the block is a noise block and not an image-content containing block, preferably, 4*MSIZE*MSIZE*8 (see FIG. 11). In a step 202, a first block to be scanned is selected. In a step 204, the values of various variables are updated, as described in more detail with reference to FIG. 11. In steps 206, 208 and 210, the total number of blocks is incremented and step 204 is repeated if not all the blocks were scanned. Possibly, in some embodiments of the invention, not all the blocks are scanned, for example, based on an analysis of results of the block scanning and/or based on a predetermining selection of blocks to scan. In a step 212, boundary_frac, the fraction of the image which contains completely black or noisy black pixels, and the noise standard deviation, are estimated by calculation.

FIG. 11 is a flowchart of a method of parameter estimation of a single block of an image, for the method of FIG. 10. In a step 220, the number of zero-valued pixels are counted, giving count_zero. Also, the mean pixel value is preferably determined. If the number of zerovalued pixels is over a threshold max_zero (222), the block is assumed to belong wholly or in part to the boundary areas (typically, zero valued pixels are not common in content-portions of the image) and the variable count_boundary is incremented (224). Max_zero is preferably a constant, for example, MSIZE*MSIZE/5. If the count_zero is under threshold max_zero, a determination is made whether the mean is under a threshold max_noise_mean (226). If the mean is smaller, the block is suspected of belonging to the noisy boundary, since it is mostly near-zero values. The sum of squares of pixel value deviations from the mean (noise_sum) is then determined (228). If noise_sum is under a noise threshold noise_thresh (230), the block is assumed to be part of the noisy boundary and count_boundary is incremented (232).

Noise_thresh is preferably initialized (step 220, FIG. 10) to a predetermined value, for example 4*64*MSIZE*MSIZE. Whenever 4*noise_sum is smaller than noise_thresh, noise_thresh is reset to 4* noise_sum (234, 236). Alternatively, noise_thresh may be determined by other statistical attributes of the distribution of apparent noise in the image, for example the distribution shape and/or the distribution standard deviation.

Also, min_sum is preferably updated to be the smallest noise_sum, in all the scanned blocks (238, 240). If the mean is larger than max_noise_mean (226), the block is assumed to belong to the content-portion of the image. Preferably however, noise_sum is determined, in order to update min_sum (242, 244, 246). It should be noted with regard to step 242 and/or step 228, that if a partially determined noise_sum exceeds the relevant thresholds (min_sum, noise_thresh/4), the determination of noise_sum may be interrupted.

The above method of estimating noise levels in an image may be varied in various ways, for example, separately counting noisy black blocks and completely black blocks. Alternatively, other methods may be used, for example, by histogram analysis.

Referring back to FIG. 2, in the next step, a wavelet transform is performed (36) on the image data, to generate four sets of coefficients: H (horizontal), V (vertical), D (Diagonal) and A (approximation or average). In multi-layer transforms, set A is further transformed at a later step. These coefficients are then quantized and stored in data blocks to be transmitted (38). In a preferred embodiment of the invention, each transform layer is separately outputted to the quantizing stage, to reduce memory requirements. Preferably, each data block contains coefficients from only two layers. Therefore, 36 and 38 are repeated multiple times.

Figure 3:
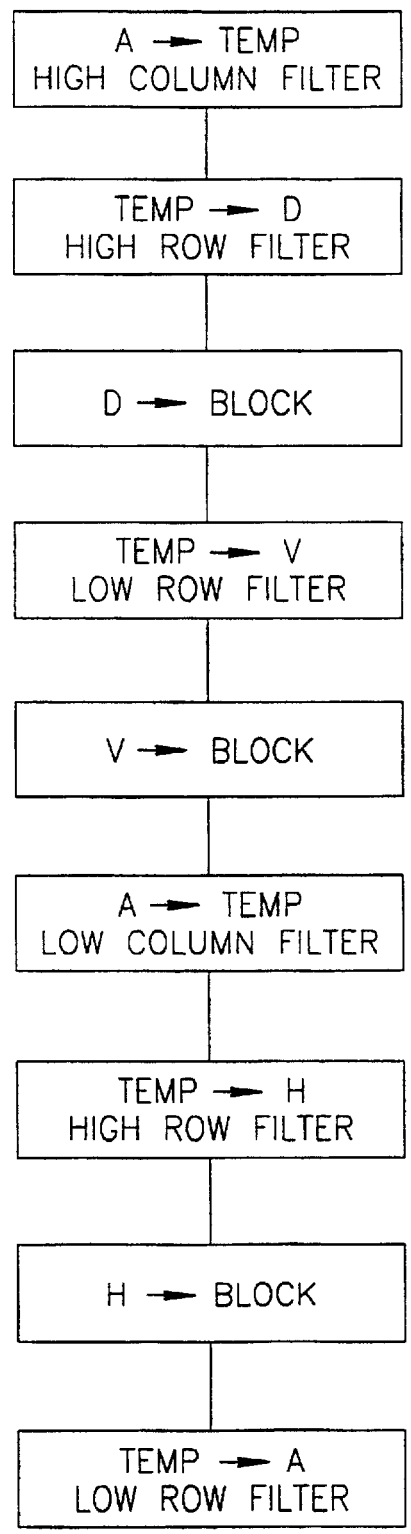
FIG. 3 is a schematic flowchart of the wavelet transform process.

In a preferred embodiment of the invention, the wavelet transform uses the well known 7/9 Daubenchies biorthogonal wavelets. Preferably, the transform uses symmetrized boundaries. FIG. 3 is a schematic flowchart of the wavelet transform process, in accordance with a preferred embodiment of the invention. The input (A) is preferably stored as an array of "short" (16 bits) when A is the original image and as an array of "float" (32 bits) when A is a result of a previous decomposition. In FIG. 3, the notation X→Y means that X is transformed to Y, while performing the function (if any) defined below the arrow. The process of transforming a set of coefficients to a data block is described with reference to FIGS. 4 and 5, below.

Figure 4:
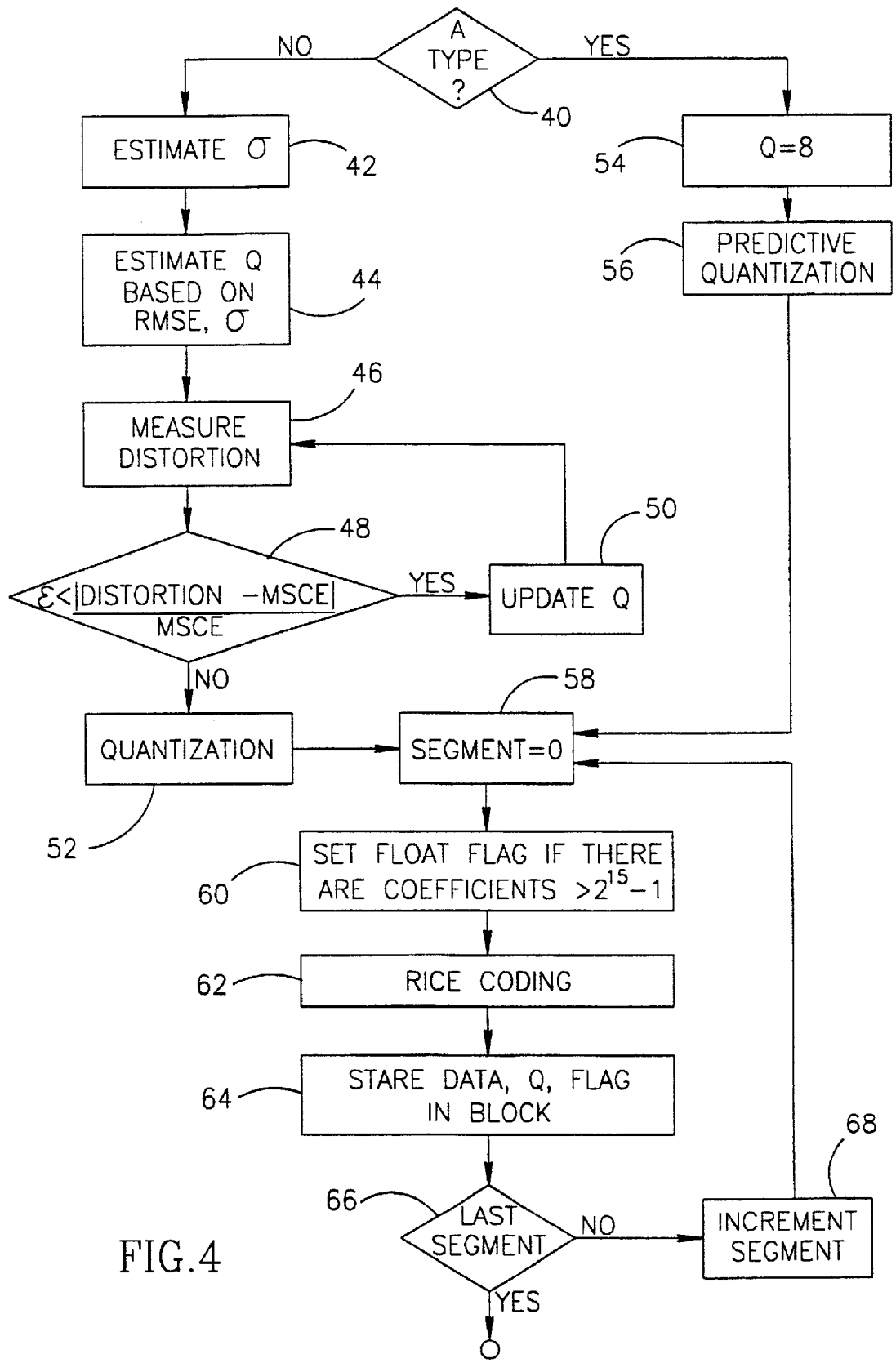
FIG. 4 is a flowchart of a method of quantizing and coding wavelet coefficients, in accordance with a preferred embodiment of the invention.

FIG. 4 is a flowchart of a method of quantizing wavelet coefficients, in accordance with a preferred embodiment of the invention. However, in accordance with other preferred embodiments of the invention, other quantization methods, especially those in which the quantization can be controlled to achieve a desired RMSE, PSNR (Peak signal to noise ratio) or other quality measure, may be used. In a preferred embodiment of the invention, "A" type coefficients are treated differently from detail coefficients (D, V and H) (40). "A" type coefficients are preferably quantized using a quantization parameter, Q, of 8 (54). Predictive type quantization (56) is applied to the coefficients. The value of each coefficient $c(i,j)$ is estimated according to the values of the three dequantized coefficients $d(i,j-1)$, $d(i-1,j)$ and $d(i-1,j-1)$ above and to the left of it, where i and j are spatial coordinates of rows and columns, respectively. These dequantized coefficients will be regenerated at the decompression client from the quantized coefficient data. The difference between the estimation and $c(i,j)$ is preferably linearly quantized using the quantization factor Q. Alternatively, Q is calculated in a manner similar to that of detail coefficients (described below). Alternatively or additionally, different quantization factors may be set for different wavelet layers, for example, increasing with layer number. These factors may be set using a perceptual model and may be different for different coefficient set types (D, H, V).

Detail coefficients are preferably quantized using a simple linear quantization (52), however, in other preferred embodiments of the invention other types of quantization methods may be used, for example, logarithmic quantization. A standard deviation of the coefficients (42) and the target RMSE are used to estimate Q (44), preferably from a lookup table, which preferably contains previously estimated values for Q under various situations. Q is then iteratively changed (50) until the difference between the actual distortion (46) and the desired target distortion (MSE=RMSE*RMSE), divided by the desired distortion, is smaller than a predefined limit $\epsilon$ (48), preferably 0.1. Alternatively, other stopping criteria may be used, for example, that the distortion in a particular region of interest is within a desired number. Alternatively or additionally the number of allowed iterations is limited to a predefined amount. As described above, a subset of the coefficients, may be used for calculating the standard deviation and Q. For example, if the number of coefficients exceeds 3000 or 5000, only every one of every n/3000 or n/5000 coefficients is used.

If any of the coefficients have an absolute value greater than 32767, then a "short" integer will not be sufficient to store them. In a preferred embodiment of the. invention, the decompression client is notified, via a flag (60), of this fact prior to receiving the coefficients, so that it can prepare an array of the proper data size and/or decide to round off the difference. Preferably, such a flag is generated for each segment. Alternatively, such a flag is created only for each block or for each wavelet layer. Alternatively, such a flag is created only per picture.

The coefficients are preferably entropy coded, preferably using Rice coding and/or run-length-encoding for zero coefficients (62). The data for each segment is then placed in a block.

Figure 5:
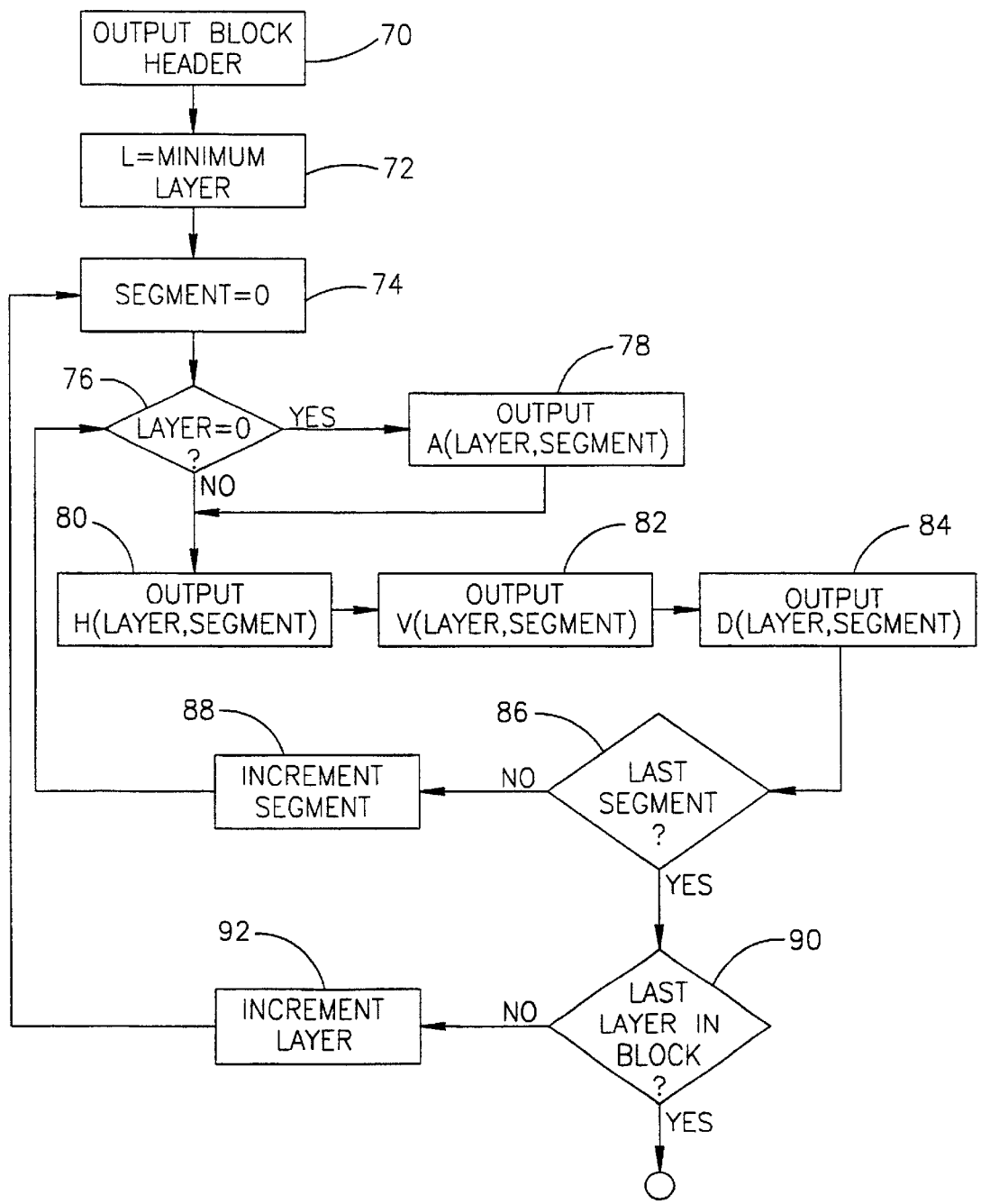
FIG. 5 is a flowchart of the organization of data in a single data block, for transmission, in accordance with a preferred embodiment of the invention.

FIG. 5 is a flowchart of the organization of a single data block, in accordance with a preferred embodiment of the invention. First, a block header is output (70). Then two loops are set up, a loop on the layers in the block (72, 90, 92) and a loop on the segments in each layer (74, 86, 88). It should be noted that the minimum layer in a block will usually not be the first layer (there are preferably two layers in a block). If the minimum layer is the first layer of the image (76), the "A" coefficients are outputted (78) (see FIG. 6 for details). In any case, the H, V and D coefficient sets are outputted (80, 82, 84) thereafter. This completes the "segment" loop, which is embedded in the "layer" loop.

Figure 6:
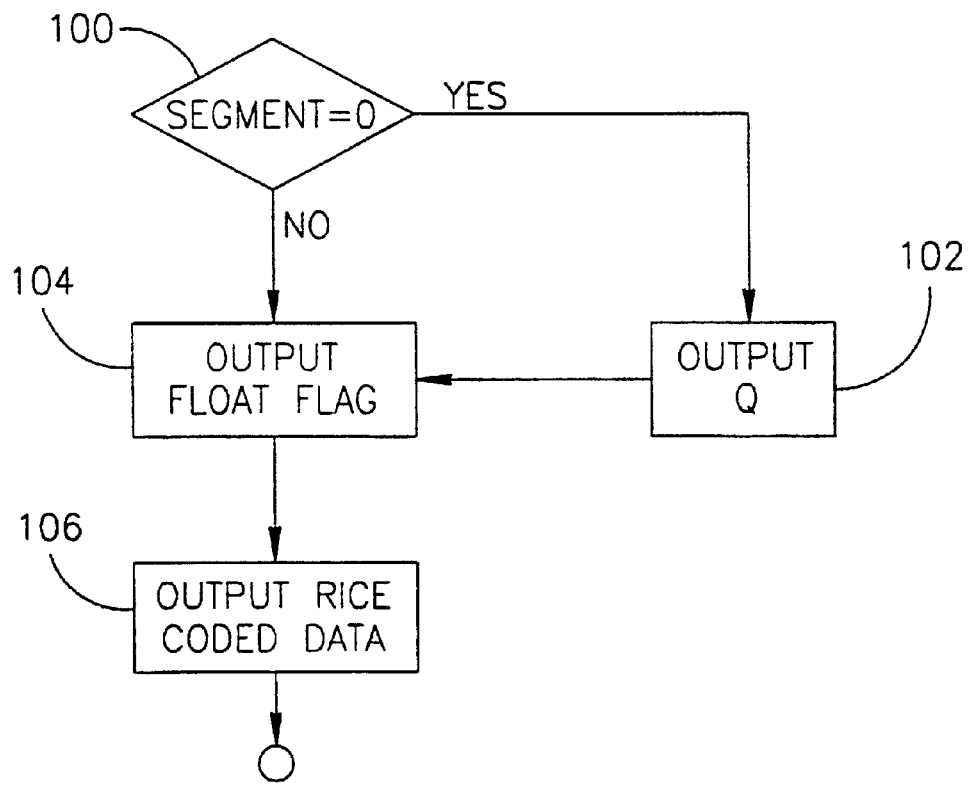
FIG. 6 is a flowchart of a process for transmitting the segments of FIG. 5, in accordance with a preferred embodiment of the invention.

FIG. 6 is a flowchart of a process for transmitting the segments of FIG. 5 (78, 80, 82 and 84), in accordance with a preferred embodiment of the invention. Q is outputted (102) if the segment is the first segment in the block (100). It should be appreciated that a different Q can be assigned and outputted for each segment, it accordance with other preferred embodiments of the invention. Thereafter, a flag which indicates whether the coefficients in the segments should be decompressed as a "short" or as "float", is outputted (104). After these preliminary data are sent, the actual Rice encoded coefficients are outputted (106).

As mentioned above, the purpose of segmenting the coefficient sets is to reduce the size of data arrays necessary in the decompression client for reconstructing the compressed image. When the entropy encoded coefficients are received at the client, they are decoded to produce quantized and then the coefficients are reconstructed from the quantized data. Preferably, as described above, the coefficients are reconstructed into memory arrays having a number of bits necessary for representing these coefficients. The inverse wavelet transform proceeds in stages, with each stage reconstructing a layer using previously reconstructed layers. Thus, at each stage of the inverse wavelet transform, four set of coefficients A, H, V and D are transformed into a single set of coefficients A'. Set A' is used as the starting "A" in the next stage of reconstruction. In each stage of the inverse wavelet transformation, the coefficient sets are upscaled, i.e., oversampled by two. In general, the segments of A', A, H, V and D all have the same number of coefficients, but A' has twice the number of columns. Thus, it will generally have half the number of rows.

Figure 7:
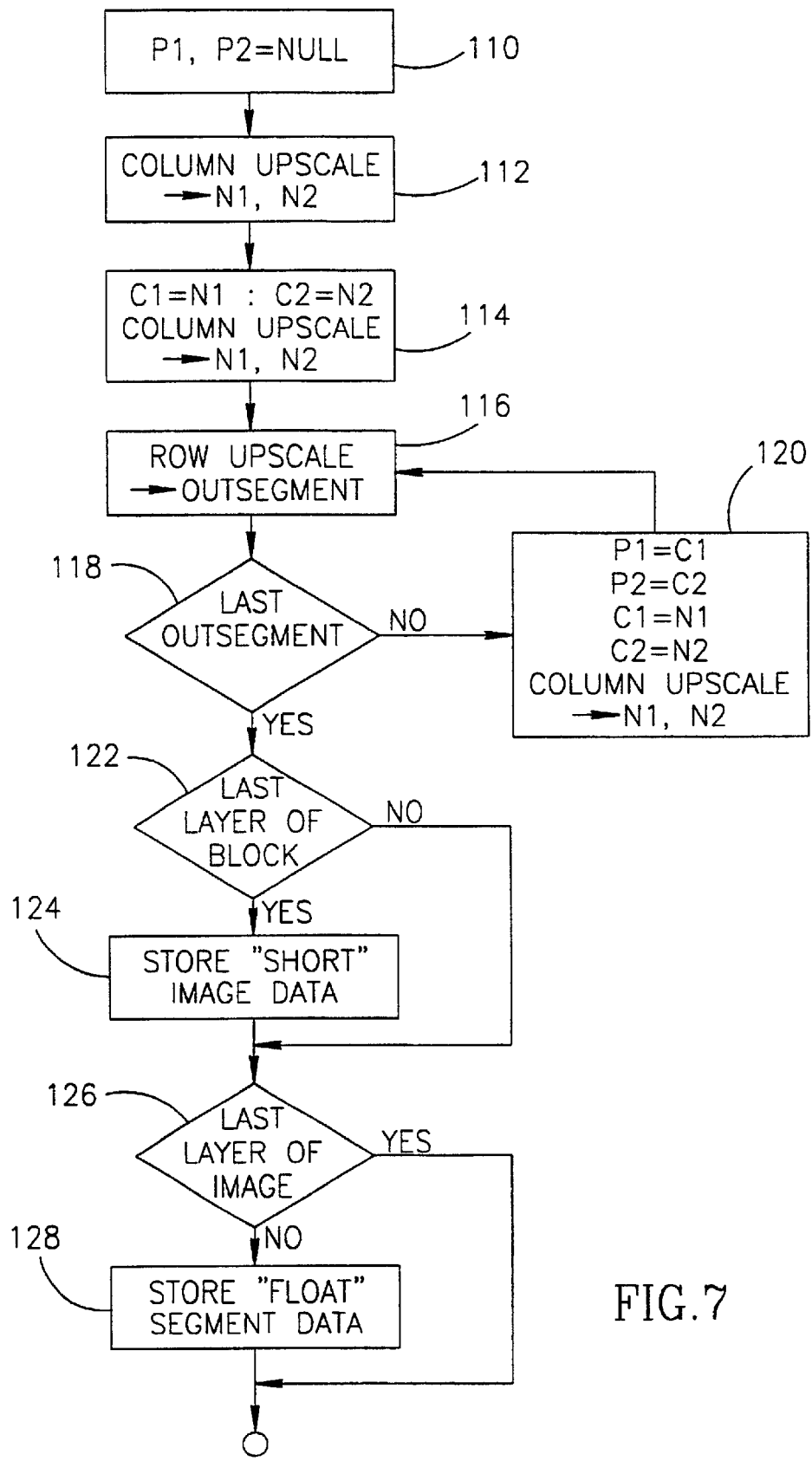
FIG. 7 is a flowchart of a single iteration of an inverse wavelet transformation, in accordance with a preferred embodiment of the invention.

FIG. 7 is a flowchart of a single iteration of an inverse wavelet transformation, in accordance with a preferred embodiment of the invention. A feature of this particular implementation is that the coefficients are segmented so that memory arrays required at the decompression client have a small size. Generally the number of rows in each sub-segment is a one quarter of the number of rows in the input segments. Thus, four sub-segments are generated from each set of input segments of A, H, V and D.

In a preferred embodiment of the invention, the filters which are used for upscaling a row, utilize several rows on each side of the upscaled row. Since, the segments preferably do not contain all the rows in a layer and several rows before and after each segment must be known to properly perform the upscaling for the rows at the edges of the segments, in a preferred embodiment of the invention, these several rows are stored in temporary variables, (P1, P2, N1 and N2). Preferably the entire previous and next segments are stored in—or pointed to—by these variables. Another aspect of the filters used is their treatment of boundary conditions. In a preferred embodiment of the invention, when the previous and/or next segments are stored as null, i.e., at the top and bottom edges of the layer, symmetrized boundary conditions are used.

In a particular iteration, variables containing the two previous segments P1 and P2 are initialized to zero (110). Next, two sub-segments N1 and N2 are generated by column upscaling new data segments (described in FIG. 8, below). These two sub-segments are stored in temporary variables C1 and C2 and two additional new sub-segments N1 and N2 are created by column upscaling of new data segments (114). Then a row upscaling step is performed to generate an output segment (116). If it is not the last output segment (118), then the subsegments are shifted, C1 and C2 are shifted into P1 and P2; and N1 and N2 are shifted into C1 and C2; thereafter new N1 and N2 are generated by column upscaling of new data segments (120).

At the last output segment of the layer (118), if it is the last layer of the block (122), the data in the output segments are stored as "short" image data (124), i.e., a reconstructed image of that layer. Alternatively, an image may be reconstructed from every layer.

In any case, if it is not the last layer of the image (126), the segment data is stored as "float" type data (128), to be used in the next iteration of the inverse wavelet transform.

Figure 8:
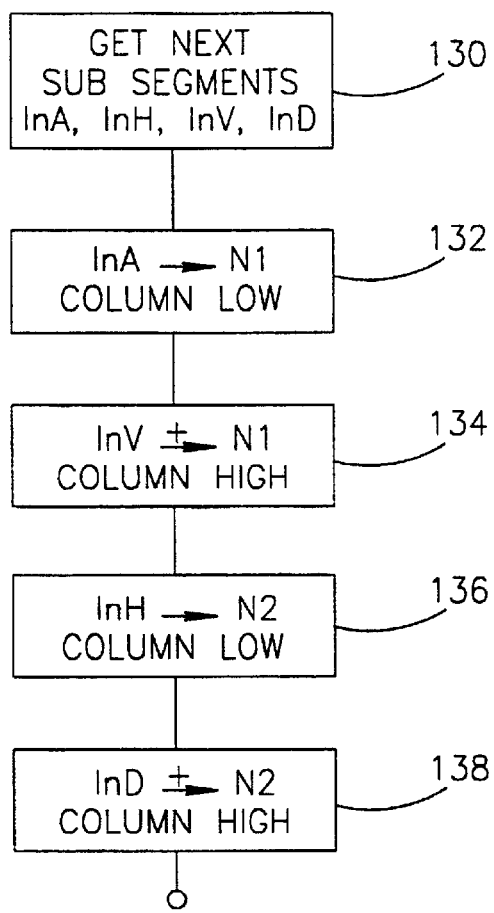
FIG. 8 is a flowchart of a column upscale step of FIG. 7.

FIG. 8 is a flowchart of a column upscale step of FIG. 7. Each time the column upscale step is performed, new data is used. Generally, each time the upscale is performed, a quarter of a segment is used. However, in the last segment, using the same number of rows as in previous segments may translate into a portion other than one quarter of a segment. In each upscale step, one quarter of each of the data segments A, V, H and D is used to generate two subsegments n1 and n2. The notations InA, InH, InV and InD are used to indicate the next quarter segments which are read from each of A, H, V and D. The notation X→Y means that X is transformed into X' which is added to Y, while performing the filtering described beneath the arrow. Thus, InA is transformed into N1, using a column low filter (132); InV is transform-added to N1 using a column high filter (134); InH is transformed to N2 using a columnn low filter (136) and InD is transform-added to N2 using a column high filter (138). Typically, the data for InA will be from a previous stage of the inverse transform, while InV, InD and InH will be read from a data stream from the server. In the first layer, InA will also be read from the data stream. The column upscale filter preferably uses symmetrized boundaries, although a periodic boundary filter may also be used, if the server uses periodic boundaries.

Figure 9:
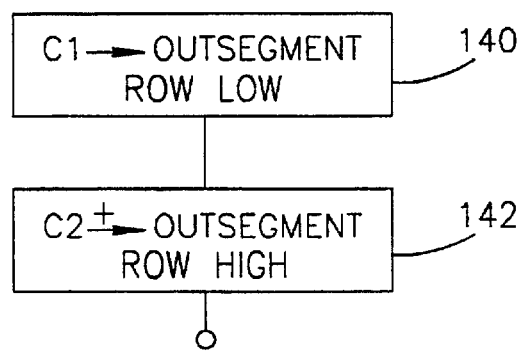
FIG. 9 is a flowchart of a row upscale step of FIG. 7.

FIG. 9 is a flowchart of a row upscale step of FIG. 7. In the row upscale step, at the first few and last few rows of each segment, the rows from the previous segment (P1 and P2) and the next segment (N1 and N2) are preferably used for filtering C1 and C2. C1 is transformed into an output segment, using a row low filter (142) and C2 is transform-added to the output segment, using a row high filter (142). When P1 and P2 are null or when N1 and N2 are null, a symmetrized boundary is used by the filters. N1 and N2 are set to null when there is no data to be read for them (FIG. 8).

It should be appreciated that the above described methods of lossy image compression contain many features, not all of which need be practiced in all embodiments of the invention. Rather, various embodiments of the invention will utilize only some of the above described techniques, features or methods and/or combinations thereof. In addition, although the above description is focused on methods, apparatus for performing these methods, for example a software/hardware combination, is also considered to be within the scope of the invention.

It will be appreciated by a person skilled in the art that the present invention is not limited by what has thus far been described. Rather, the present invention is limited only by the claims which follow. When used in the following claims, the terms "comprises", "comprising", "includes", "including" or the like means "including but not limited to".

What is claimed is:

1. A method of compressing a medical image, comprising:
providing a medical diagnostic image, having associated therewith at least one windowing parameter;
automatically selecting by a computer of a desired compressed image quality, responsive to said at least one windowing parameter; and
compressing said image, using a lossy compression method, such that a decompressed image will have substantially said desired compressed image quality.

2. A method according to claim 1, wherein the at least one windowing parameter comprises a window width.

3. A method according to claim 1, wherein the at least one windowing parameter is automatically estimated.

4. A method according to claim 3, wherein said at least one windowing parameter is automatically estimated from an earlier automatically estimated windowing parameter and from a human supplied windowing parameter.

5. A method according to claim 4, wherein said human-supplied windowing parameter and said earlier automatically estimated windowing parameter each comprise a window width.

6. A method according to claim 5, wherein said compressed image quality is selected responsive to a minimum of said widths.

7. A method according to claim 5, wherein said compressed image quality is selected responsive to a function of said widths.

8. A method according to claim 1, wherein said at least one windowing parameter is provided by a viewing technician.

9. A method according to claim 1, wherein said at least one windowing parameter is provided by a diagnostician.

10. A method according to claim 1, wherein said at least one windowing parameter is associated with said image in a DICOM description of said image.

11. A method according to claim 3, wherein said at least one windowing parameter is determined responsive to an acquisition modality of said medical image.

12. A method according to claim 3, wherein said at least one windowing parameter is determined responsive to a content of said medical image.

13. A method according to claim 1, wherein said automatically selecting comprises automatically selecting a desired compressed image quality, responsive to at least one viewing parameter supplied by a diagnostician, in association with the viewing of the image.

14. A method according to claim 13, wherein aatomatically selecting a desired compressed image quality comprises selecting a desired compressed image quality as a function of said at least one windowing parameter and said at least one viewing parameter.

15. A method according to claim 13, wherein said at least one viewing parameter comprises a viewing resolution.

16. A method according to claim 13, wherein said at least one viewing parameter comprises a region of interest.

17. A method according to claim 13, wherein said at least one viewing parameter comprises an image processing function.

18. A method according to claim 13, comprising determining a windowing width responsive to said at least one viewing parameter.

19. A method of compressing a medical image, comprising:
providing a medical diagnostic image, having associated therewith at least one viewing parameter supplied by an imaging technician, in association with the acquisition and storage of the image;
automatically selecting, by a computer, of a desired compressed image quality, responsive to said at least one viewing parameter; and
compressing said image, using a lossy compression method, such that a decompressed image will have substantially said desired compressed image quality.

20. A method according to claim 19, wherein the at least one viewing parameter comprises at least one windowing parameter.

21. A method according to claim 20, wherein the at least one windowing parameter comprises a window width.

22. A method according to claim 1, wherein automatically selecting comprises automatically selecting a desired compressed image quality, responsive to diagnosis related information associated with the medical image.

23. A method of decompressing a medical image, comprising:
providing a medical diagnostic image, having associated therewith diagnosis related information;
automatically selecting, by a computer, of a desired compressed image quality, responsive to said diagnosis related information; and
compressing said image, using a lossy compression method, such that a decompressed image will have substantially said desired compressed image quality.

24. A method according to claim 23, wherein the diagnosis related information comprises an identification of a body portion imaged in the image.

25. A method according to claim 23, wherein the diagnosis related information comprises an identification of a required diagnosis of the image.

26. A method according to claim 23, wherein the diagnosis related information comprises an identification of a body tissue to be diagnosed.

27. A method according to claim 23, wherein the diagnosis related information comprises an imaging modality of the image.

28. A method according to claim 1, wherein said automatically selecting a desired compressed image quality comprises automatically selecting a desired compressed image quality responsive to a noise level in at least a part of said image.

29. A method according to claim 28, wherein said automatically selecting, comprises automatically selecting said image quality responsive to an image quality measure determined from said noise level and responsive to an image quality measure determined from a windowing width associated with said image.

30. A method according to claim 29, wherein said noise image quality measure and said windowing image quality measure comprise RMSE values.

31. A method according to claim 30, wherein automatically selecting an image quality measure comprises automatically selecting an image quality measure which is equal to or higher than the lower between said noise RMSE and said windowing RMSE.

32. A method of compressing a medical image, comprising:
providing a medical diagnostic image;
automatically selecting, by a computer of a desired compressed image quality responsive to a noise level in at least a part of said image; and
compressing said image, using a lossy compression method, such that a decompressed image will have substantially said desired compressed image quality.

33. A method according to claim 32, wherein said noise level is independently determined for a plurality of portions of said image.

34. A method according to claim 32, wherein said noise level is determined responsive to an estimation of distribution of noise values in the image.

35. A method according to claim 32, wherein said noise level is estimated responsive to a lowest standard deviation determined in each of a plurality of parts of the image.

36. A method according to claim 35, wherein said plurality of parts comprises at least 50 parts, each of which is no larger than 1/50 of the area of the image.

37. A method according to claim 32, wherein said noise level is determined by analyzing noisy black boundary portions of said image.

38. A method according to claim 1, wherein compressing comprises compressing using a transform method which generates coefficients.

39. A method according to claim 38, wherein the transform method comprises a wavelet transform.

40. A method according to claim 38, wherein the transform method comprises a cosine transform.

41. A method according to claim 38, wherein the transform method comprises a Fourier transform.

42. A method according to claim 38, wherein the transform method comprises a Hadamard transform.

43. A method according to claim 38, wherein the transform method comprises a linear transform.

44. A method according to claim 38, wherein compressing comprises quantizing said coefficients.

45. A method according to claim 1, wherein compressing comprises quantizing.

46. A method according to claim 44, wherein quantizing comprises linear quantizing.

47. A method according to claim 45, wherein quantizing comprises predictive quantizing.

48. A method according to claim 44, wherein quantizing comprises human-visual-perception-weighted quantizing.

49. A method according to claim 45, wherein quantizing comprises quantizing to meet said desired compressed image quality.

50. A method according to claim 49, wherein quantizing comprises iteratively determining parameters for said quantizing, to meet said desired compressed image quality.

51. A method according to claim 49, wherein said image is divided into a plurality of regions and wherein a different image quality target is defined for each region.

52. A method according to claim 50, wherein said image comprises significant regions where only a small distortion by compression is expected and wherein said desired image quality is selected responsive to an expected average distortion outside said significant regions.

53. A method according to claim 1, wherein said desired compressed image quality comprises a measure of an error between the image and the compressed-and-reconstructed image.

54. A method according to claim 53, wherein the quality measure comprises a root mean square error (RMSE).

55. A method according to any of claim 1, wherein providing a medical image comprises providing a medical image to a server responsive to a request by a client and comprising transmitting said compressed image to said client.

56. A method according to claim 55, comprising reconstructing said image, at said client, to a full range of gray scale values.

57. A method according to claim 55, wherein said client transmits information related to the image to said server and wherein said image quality, for later images, is determined responsive to said information.

58. A method according to claim 57, wherein said information comprises a region of interest.

59. A method according to claim 57, wherein said information comprises at least one windowing parameter.

60. A method of compressing a medical image, comprising:
providing a medical diagnostic image, having associated therewith at least one technician supplied windowing parameter;
automatically selecting a desired compression ratio for a transform based lossy compression method, responsive to said at least one windowing parameter; and
compressing, using said lossy compression method, said image to the desired compression ratio.

61. A method of quantizing data for compression thereof, comprising:
providing information relating to a desired diagnosis of an image associated with said data;
automatically selecting, by a computer of a desired amount of error during said quantizing, responsive to said provided information; and
quantizing said data to have the desired amount of error.

62. A method according to claim 61, wherein the information comprises at least one windowing parameter selected for said desired diagnosis.

63. A method of calculating a target distortion for an image containing at least one background area and at least one important area, comprising:
determining an extent of the at least background area and an extent of the at least one important area;
determining the ratio between the two extents;
determining a certain level of distortion desired in said at least one important area; and
calculating a target distortion, for a compression method, responsive to said certain level of distortion and responsive to said ratio, such that when said image is compressed using said compression method the certain level of distortion is achieved in the important areas.

64. A method of transmitting compressed data from a server to a client computer, comprising:
determining at the server, an internal representation required to faithfully represent the data;
transmitting an indication of said representation to the client, prior to transmitting said data;
setting up, at the client, memory arrays suitable for said internal representation, responsive to said transmission; and
transmitting said data from the server to the client,
wherein said client determines whether to use said indicated representation or a less precise representation, responsive to a desired image quality at said client.

65. A method according to claim 64, wherein said data comprises transform coefficients.

66. A method according to claim 64, wherein said data is compressed using entropy encoding.

67. A method according to claim 64, wherein said determining comprises determining said representation responsive to a range of values represented by individual elements of said data.

68. A method according to claim 67, wherein said determining comprises determining a number of bits to use in said internal representation.

69. A method according to claim 64, wherein said determining comprises determining whether to use a fixed point representation or a floating point representation.

70. Apparatus for image compression, comprising:
an input which receives a diagnostic medical image and at least one viewing parameter associated with said image, from an image store;
a target distortion estimator which estimates an allowed distortion in the image responsive to the at least one viewing parameter; and
an image compressor which compresses said image to meet said target distortion.

71. A method of transmitting compressed wavelet data from a server to a client, comprising:
transforming original data to yield at least one layer, with a plurality of coefficient sets associated with each of said at least one layer;
segmenting the data in each of said coefficient sets into a plurality of segments for each coefficient set, each of said segments comprising viable data unit from which an image can be reconstructed or which can be used in conjunction with a previous layer to reconstruct an image; and
transmitting data to a client, wherein segments for different coefficient sets are interleaved so that not all the segments from a first coefficient set are transmitted before transmitting segments from at least a second coefficient set.

72. A method according to claim 71, wherein each of said segments comprises a plurality of rows from one of said coefficient sets and wherein said rows are a subset of a number of rows in the coefficient set.

73. A method according to claim 71, wherein each of said segments comprises a plurality of columns from one of said coefficient sets and wherein said columns are a subset of a number of columns in the coefficient set.

74. A method according to claim 71, comprising:
receiving at said client at least a first segment and a second segment; and
upscale filtering data in said second segment utilizing data in said first segment.

75. A method according to claim 74, wherein receiving comprises receiving data for a certain layer and comprising reconstructing data for a layer higher than said certain layer, from said received data, prior to receiving even one complete coefficient set for said certain layer.

* * * * *